United States Patent
Ansari (10) Patent No.: US 9,846,583 B2
(45) Date of Patent: Dec. 19, 2017

(54) HARDWARE POWER-ON INITIALIZATION OF AN SOC THROUGH A DEDICATED PROCESSOR

(71) Applicant: Xilinx, Inc., San Jose, CA (US)

(72) Inventor: Ahmad R. Ansari, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/969,362

(22) Filed: Dec. 15, 2015

(65) Prior Publication Data

US 2017/0168841 A1    Jun. 15, 2017

(51) Int. Cl.
   G06F 15/177    (2006.01)
   G06F 9/00    (2006.01)
   G06F 9/44    (2006.01)
   G06F 11/22    (2006.01)
   G06F 11/263    (2006.01)
   G06F 15/78    (2006.01)

(52) U.S. Cl.
   CPC .......... *G06F 9/4403* (2013.01); *G06F 9/4401* (2013.01); *G06F 11/2284* (2013.01); *G06F 11/2635* (2013.01); *G06F 15/781* (2013.01); *G06F 2011/2278* (2013.01)

(58) Field of Classification Search
   CPC ............... G06F 9/4403; G06F 11/2284; G06F 11/2635; G06F 15/781; G06F 2011/2278
   See application file for complete search history.

(56) References Cited

U.S. PATENT DOCUMENTS

| | | | | |
|---|---|---|---|---|
| 7,673,194 B1 * | 3/2010 | Sun | ..................... | G01R 31/3004 713/2 |
| 8,892,859 B1 * | 11/2014 | Eny | ..................... | G06F 11/1441 713/2 |
| 2003/0009654 A1 * | 1/2003 | Nalawadi | .............. | G06F 9/4401 713/1 |
| 2006/0244934 A1 * | 11/2006 | Yoshida | .................. | G07D 7/20 355/1 |
| 2014/0075171 A1 | 3/2014 | Karimian-Kakolaki et al. | | |
| 2014/0164753 A1 * | 6/2014 | Lee | ........................ | G06F 21/575 713/2 |
| 2015/0046692 A1 * | 2/2015 | Shin | ....................... | G06F 9/4418 713/2 |
| 2015/0113258 A1 * | 4/2015 | Grieco | ................... | G06F 21/572 713/2 |
| 2016/0004542 A1 * | 1/2016 | Das | ........................ | G06F 9/4405 713/2 |

* cited by examiner

*Primary Examiner* — Xuxing Chen
(74) *Attorney, Agent, or Firm* — Robert M. Brush (57) ABSTRACT

In an example, a system-on-chip (SoC) includes a hardware power-on-reset (POR) sequencer circuit coupled to a POR pin. The SoC further includes a platform management unit (PMU) circuit, coupled to the hardware POR sequencer circuit, the PMU including one or more central processing units (CPUs) and a read only memory (ROM). The SoC further includes one or more processing units configured to execute a boot process. The hardware POR sequencer circuit is configured to initialize the PMU. The one or more CPUs of the PMU are configured to execute code stored in the ROM to perform a pre-boot initialization.

20 Claims, 8 Drawing Sheets

```
Execute pre-PMU initialization using HW
POR sequencer                              ─ 202

▼
Execute pre-boot initialization via PMU
execution SW POR sequencing code          ─ 204

▼
Execute boot-ROM using CSU                 ─ 206

▼
Execute FSBL using APU/RPU                 ─ 208
```

HARDWARE POWER-ON INITIALIZATION OF AN SOC THROUGH A DEDICATED PROCESSOR

TECHNICAL FIELD

Examples of the present disclosure generally relate to electronic circuits and, in particular, to hardware power-on initialization of a system-on-chip (SoC) through a dedicated processor.

BACKGROUND

On a typical system-on-chip (SoC), there are many initializing tasks that need to be performed in a specific sequence to prepare the system for booting. The power-on sequencing tasks are handled entirely by hardware state machines and associated circuitry. Example power-on sequencing tasks include sequencing resets, monitoring power supplies, initializing dock circuits, performing tests, clearing memories, and the like.

A defect in the circuit design for the hardware state machines and associated circuitry can prevent the SoC from booting. As such, the SoC is typically tested and verified prior to large-scale manufacture. A defect in the power-on sequencing tasks requires re-design of the hardware state machines and associated circuitry. Further, the information needed to finalize the required power-on sequencing may not be known until the time of verification. Any change to the design of the hardware state machines and associated circuitry that performs the power-on sequencing can be costly and delays final validation of the SoC.

SUMMARY

Techniques for providing hardware power-on initialization of a system-on-chip (SoC) through a dedicated processor are described. In an example, an SoC includes a hardware power-on-reset (POR) sequencer circuit coupled to a POR pin. The SoC further includes a platform management unit (PMU) circuit, coupled to the hardware POR sequencer circuit, the PMU including one or more central processing units (CPUs) and a read only memory (ROM). The SoC further includes one or more processing units configured to execute a boot process. The hardware POR sequencer circuit is configured to initialize the PMU. The one or more CPUs of the PMU are configured to execute code stored in the ROM to perform a pre-boot initialization.

In another example, a method of booting an SoC includes performing one or more first initialization tasks using a hardware power-on-reset (POR) sequencer circuit. The method further includes performing one or more second initialization tasks by executing code stored in a read-only memory (ROM) using a platform management unit (PMU). The method further includes executing code in a boot ROM using a first processing unit. The method further includes executing a boot loader using a second processing unit.

In another example, a non-transitory computer readable medium having instructions stored thereon that when executed by a platform management unit (PMU) in an SoC cause the PMU to perform a method of: initializing test circuits in the SoC; initializing one or more circuit blocks in the SoC; initializing random access memory (RAM) in the SoC; initializing power domains in the SoC; and causing a first processing unit in the SoC to begin a boot process.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated, or if not so explicitly described.

Figure 1A:
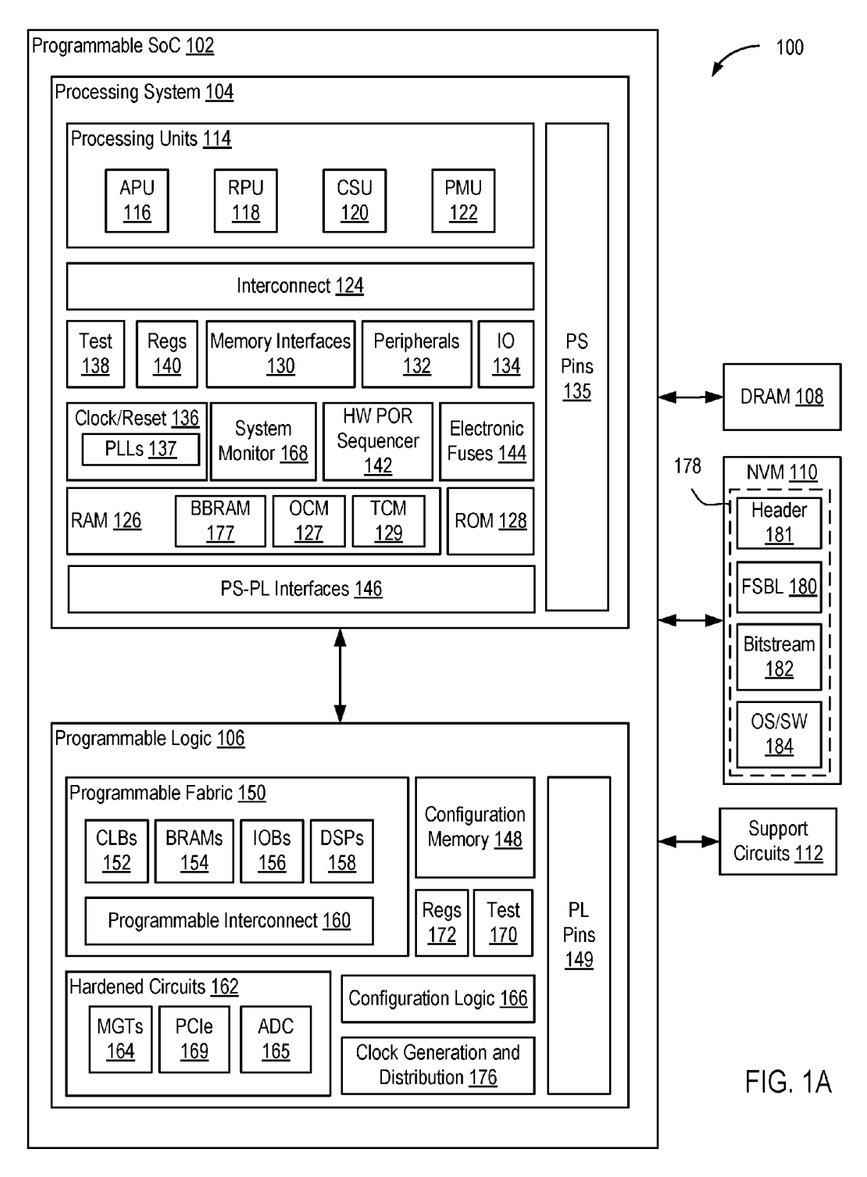
FIG. 1A is a block diagram depicting a programmable system according to an example.

FIG. 1A is a block diagram depicting a programmable system 100 according to an example. The programmable system 100 comprises a programmable system-on-chip (SoC) 102 coupled to a dynamic random access memory (DRAM) 108, a nonvolatile memory (NVM) 110, and various support circuits 112. The support circuits 112 can include oscillators, voltage supplies, and the like configured to support operation of the programmable SoC 102. The DRAM 108 can include any type of DRAM, such as synchronous DRAM (SDRAM), DDR-SDRAM, or the like. The NVM 110 can include any type of nonvolatile memory, such as any type of Flash memory, secure digital (SD) memory, or the like.

The programmable SoC 102 includes a processing system ("PS 104") and programmable logic ("PL 106"). The PS 104 includes processing units 114, interconnect 124, RAM 126, ROM 128, memory interfaces 130, peripherals 132, input/output (IO) circuits 134, clock/reset circuits 136, test circuits 138, registers (regs) 140, a hardware (HW) power-on-reset (POR) sequencer 142, electronic fuses 144, a system monitor 168, PS-PL interfaces 146, and PS pins 135. The processing units 114 can include different types of processing units, such as an application processing unit (APU) 116, a real-time processing unit (RPU) 118, a configuration and security unit (CSU) 120, and a platform management unit (PMU) 122.

The PL 106 includes a programmable fabric 150, configuration memory 148, hardened circuits 162, registers 172, test circuits 170, electronic fuses 174, clock generation and distribution circuits 176, configuration logic 166, and PL pins 149. The programmable fabric 150 includes configurable logic blocks (CLBs) 152, block RAMs (BRAMs) 154, input/output blocks (IOBs) 156, digital signal processing blocks (DSPs) 158, and programmable interconnect 160. The hardened circuits 162 include multi-gigabit transceivers (MGTs) 164, peripheral component interface express (PCIe) circuits ("PCIe 169"), analog-to-digital converters (ADC) 165, and the like.

Referring to the PS 104, each of the processing units 114 includes one or more central processing units (CPUs) and associated circuits, such as memories, interrupt controllers, direct memory access (DMA) controllers, memory management units (MMUs), floating point units (FPUs), and the like. The interconnect 124 includes various switches, busses, communication links, and the like configured to interconnect the processing units 114, as well as interconnect the other components in the PS 104 to the processing units 114.

The RAM 126 includes one or more RAM modules, which can be distributed throughout the PS 104. For example, the RAM 126 can include battery backed RAM (BBRAM 177), on-chip memory (OCM) 127, tightly coupled memory (TCM) 129, and the like. One or more of the processing units 114 can include a RAM module of the RAM 126. Likewise, the ROM 128 includes one or more ROM modules, which can be distributed throughout the PS 104. For example, one or more of the processing units 114 can include a ROM module of the ROM 128. The registers 140 include a multiplicity of registers distributed throughout the PS 104. The registers 140 can store various settings and status information for the PS 104.

The memory interfaces 130 can include a DRAM interface for accessing the DRAM 108. The memory interfaces 130 can also include NVM interfaces for accessing the NVM 110. In general, the memory interfaces 130 can include any type of volatile memory interface (e.g., DRAM, double-date rate (DDR) DRAM, static RAM (SRAM), etc.) and any type of nonvolatile memory interface (e.g., NAND Flash, NOR flash, SD memory, etc.).

The peripherals 132 can include one or more components that provide an interface to the PS 104. The peripherals 132 can include peripheral components, as well as IO interfaces to connect to external peripheral components. For example, the peripherals 132 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 132 can be coupled to the IO circuits 134. The IO circuits 134 can include multiplexer circuits, serializer/deserializer (SERDES) circuits, MGTs, and the like configured to couple the peripherals 132 to IO pins of the PS pins 135. The IO circuits 134 can also couple one or more of the peripherals 132 internally to the PL 106.

The test circuits 138 can include boundary scan chains, internal scan chains, test access port (TAP) controllers and other Joint Test Action Group (JTAG) circuits, debug access port (DAP) controllers, logic built-in-self-test (LBIST) engines, memory BIST (MBIST) engines, built-in-self-repair (BISR) engines, scan-chain clear engines, and the like configured to test and/or initialize the PS 104. The clock/reset circuits 136 can include various oscillators, frequency synthesizers, and the like to generate clocks for use by the PS 104. For example, the clock/reset circuits 136 can include a plurality of phase-locked loops (PLLs 137). The system monitor 168 can include logic for obtaining measurements from various sensors on the programmable SoC 102 (e.g., temperature sensors, voltage sensors, and the like). HW POR sequencer 142 can include circuitry, such as hardware state machines and associated logic, configured to initialize portions of the programmable SoC 102 for operation of the PMU 122, as discussed below. The electronic fuses 144 can form a one-time programmable memory to store various settings and data for the programmable SoC 102. The PS pins 135 provide an external interface to various components of the PS 104, such as the IO circuits 134, the memory interfaces 130, the test circuits 138, and the like. The PS pins 135 also include various other pins, such as voltage supply pins, clock pins, POR pins, boot mode pins, and the like. The PS-PL interface 146 can include IO interfaces between the PL 106 and various components of the PS 104, such as the peripherals 132, the RAM 126, the processing units 114, and the like.

Referring to the PL 106, the configuration logic 166 can include circuitry for loading a configuration bitstream into the configuration memory 148. In some examples, the configuration logic 166 can receive a configuration bitstream from the PS 104 during the boot process. In other examples, the configuration logic 166 can receive the configuration bitstream from another port coupled to the PL 106 (e.g., a JTAG port that is part of the test circuits 170). The configuration memory 148 includes a plurality of SRAM cells that control the programmable features of the PL 106, such as the programmable fabric 150 and programmable features of the hardened circuits 162.

The programmable fabric 150 can be configured to implement various circuits. The programmable fabric 150 can include a large number of different programmable tiles, including the CLBs 152, the BRAMs 154, the IOBs 156, and the DSPs 158. The CLBs 152 can include configurable logic elements that can be programmed to implement user logic. The BRAMs 154 can include memory elements that can be configured to implement different memory structures. The IOBs 156 include IO circuits that can be configured to transmit and receive signals to and from the programmable fabric 150. The DSPs 158 can include DSP elements that can be configured to implement different digital processing structures. The programmable interconnect 160 can include a multiplicity of programmable interconnect elements and associated routing. The programmable interconnect 160 can be programmed to interconnect various programmable tiles to implement a circuit design.

The hardened circuits 162 include various circuits that have dedicated functions, such as the MGTs 164, the PCIe circuits 169, the ADC circuits 165, and the like. The hardened circuits 162 are manufactured as part of the IC and, unlike the programmable fabric 150, are not programmed with functionality after manufacture through the loading of a configuration bitstream. The hardened circuits 162 are generally considered to have dedicated circuit blocks and interconnects, for example, which have a particular functionality. The hardened circuits 162 can have one or more operational modes that can be set or selected according to parameter settings. The parameter settings can be realized, for example, by storing values in one or more of the registers 172. The operational modes can be set, for example, through the loading of the configuration bitstream into the configuration memory 148 or dynamically during operation of the programmable SoC 102.

The clock generation and distribution circuits 176 can include PLLs, clock buffers, and the like for generating and distributing clocks throughout the PL 106. The test circuits 170 can include boundary scan chains, internal scan chains, TAP controllers and other JTAG circuits, and the like for testing the PL 106. The registers 172 can be distributed throughout the PL 106. For example, the registers 172 can include registers for setting parameters of the hardened circuits 162. The PL pins 149 provide an external interface to various components of the PL 106, such as the IOBs 156, the MGTs 164, the PCIe circuits 169, the ADC circuits 165, the test circuits 170, and the like.

Figure 1B:
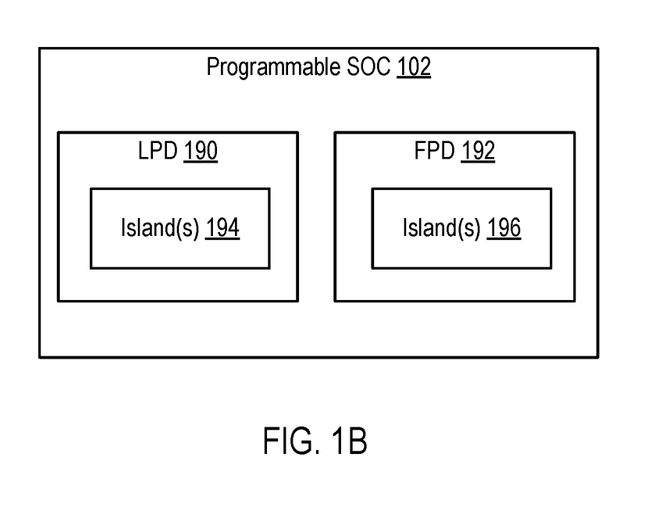
FIG. 1B is a block diagram of the programmable SoC of FIG. 1A showing different power domains.

FIG. 1B is a block diagram of the programmable SoC 102 showing different power domains. For example, the programmable SoC 102 can include a plurality of power domains, such as a low-power domain (LPD) 190 and a full-power domain (FPD) 192. While two power domains are shown in the example, the programmable SoC 102 can include any number of power domains. The components of the PS 104 and the components of the PL 106 can be distributed among the power domains. For example, within the PS 104, the LPD 190 can include the RPU 118, the CSU 120, the PMU 122, one or more peripherals 132, one or more RAMs in the RAM 126 (e.g., OCM), and the like. Within the PS 104, the FPD 192 can include the APU 116, one or more peripherals 132 (e.g., a GPU, a display interface, SATA ports, PCIe ports, etc.), and the like. The power domains can include a plurality of islands. Thus, the LPD 190 can include islands 194 and the FPD can include islands 196. The components within each domain can be further divided among the islands. For example, the LPD 190 can include USB ports, and the USB ports can be in different ones of the islands 194. The power domains can be powered on independently of one another. Further, the islands within each power domain can be powered on independently of one another. As described further herein, the PMU 122 is configured to control the power domains and islands within the programmable SoC 102.

Returning to FIG. 1A, to configure the programmable SoC 102, a user can store one or more system images 178 in the NVM 110. A system image 178 can include a header 181, a first stage boot loader (FSBL) 180, a bitstream 182, and an operating system (OS) or other software ("OS/SW 184"). After a POR pin of the PS pins 135 is deasserted, the PS 104 begins the boot process. The PS 104 executes boot code in the ROM 128 (referred to as "BootROM"), which reads the header 181 and then reads, authenticates, and stores the FSBL 180 in the RAM 126 (e.g., in OCM). In an example, the CSU 120 can execute the BootROM to load the FSBL 180. The APU 116 or RPU 118 can be used to execute the FSBL 180, which can load the bitstream 182 to the PL 106 and begin execution of the OS/SW 184.

Before the CSU 120 can begin executing the BootROM, the PS 104 needs to be initialized (referred to as "power-on initialization"). Power-on initialization includes tasks performed for a power-on reset (e.g., a cold reset) or for a system reset (e.g., a warm reset). Example initialization tasks include sequencing of resets to different parts of the PS 104, monitoring power supplies, initial configuration of the clock/reset circuits 136, control of BIST engines in the test circuits 138 for memory and logic, control of redundancy engines (e.g., BISR engines), control of isolation between different parts of the PS 104 (e.g., power domains, power islands, etc.), clearing the RAM 126 as part of security requirements, and the like. In some SoCs, these initialization tasks are entirely performed using hardware state machines and associated circuits. Typically, any error in such hardware prevents the device from booting, which complicates verification and testing during manufacture. Further, in some cases, information to finalize the sequencing of initialization tasks is not known until after manufacture and testing of a device. This results in costly design changes to the sequencing hardware.

In examples, the HW POR sequencer 142 is configured to perform a minimal number of initialization tasks to enable operation of the PMU 122. Thereafter, the PMU 122 completes power-on initialization through execution of code stored in the ROM 128. Once power-on initialization is complete, the PMU 122 invokes the CSU 120 to begin execution of the BootROM. Modification of the sequencing of power-on initialization tasks can be achieved by modifying the power-on initialization code stored in the ROM 128. Changing the ROM 128 requires only a metal mask change, which is less costly and does not require re-implementation of the design. Since the HW POR sequencer 142 performs only minimal initialization, it is less likely that costly design changes will be required during testing of the boot sequence.

FIG. 1A shows one example system in which power-on initialization of an SoC through a dedicated processor can be used. The techniques for power-on initialization described herein are applicable to SoCs having different structures than that shown in FIG. 1A. For example, the power-on initialization techniques can be used in an SoC that does not have the PL 106, but rather includes all hardened circuits (e.g., an application specific integrated circuit (ASIC)). Further, the PS included in the SoC can have a different structure than the PS 104. In general, a PS in an SoC can include a hardware sequencer to perform the minimal initialization tasks and a processor to execute code stored in ROM to complete the power-on initialization.

Figure 2:
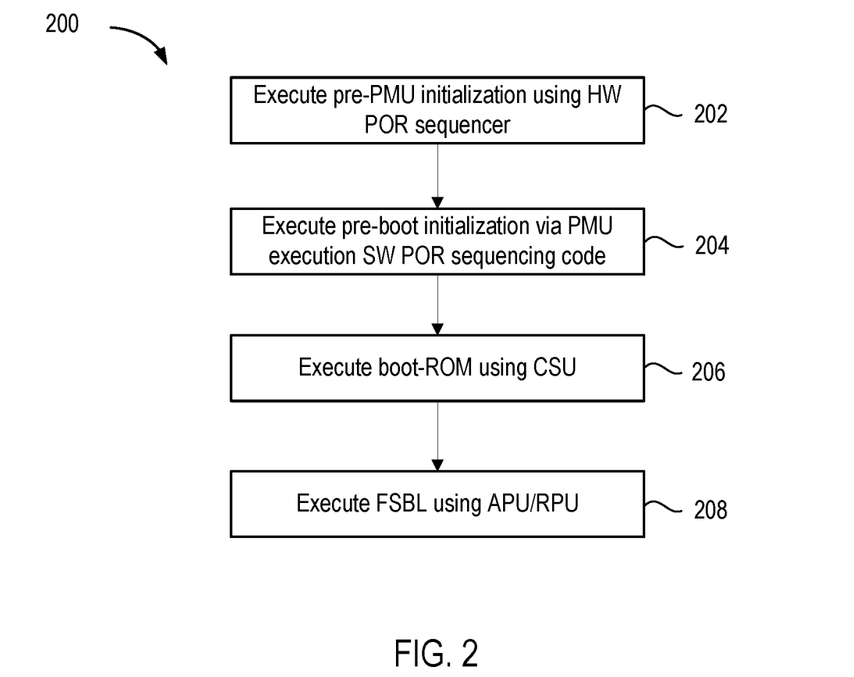
FIG. 2 is a flow diagram depicting a method of booting a programmable SoC according to an example.

FIG. 2 is a flow diagram depicting a method of booting the programmable SoC 102 according to an example. The boot process includes four stages 202 through 208. In a first stage 202, the HW POR sequencer 142 performs pre-PMU initialization. The pre-PMU initialization includes a minimal set of initialization tasks to prepare the PMU 122 for operation. In a second stage 204, the PMU 122 performs pre-boot initialization by executing pre-boot initialization code stored in the ROM 128. The pre-boot initialization code specifies a set of initialization tasks that prepare the PS 104 for execution of the BootROM. Power-on initialization of the programmable SoC 102 is complete after execution of stages 202 and 204. In a third stage 206, the CSU 120 executes the BootROM to initiate the boot process. The BootROM can include tasks for further initialization of the PS 104 and reading, authenticating, and triggering execution of the FSBL 180. In a fourth stage 208, the APU 116 or RPU 118 executes the FSBL 180. The FSBL 180 can include tasks for further initialization of the PS 104, initialization of the PL 106, and handoff to the OS/SW 184. Examples of the stages 202 through 208 are described in further detail below.

Figure 3:
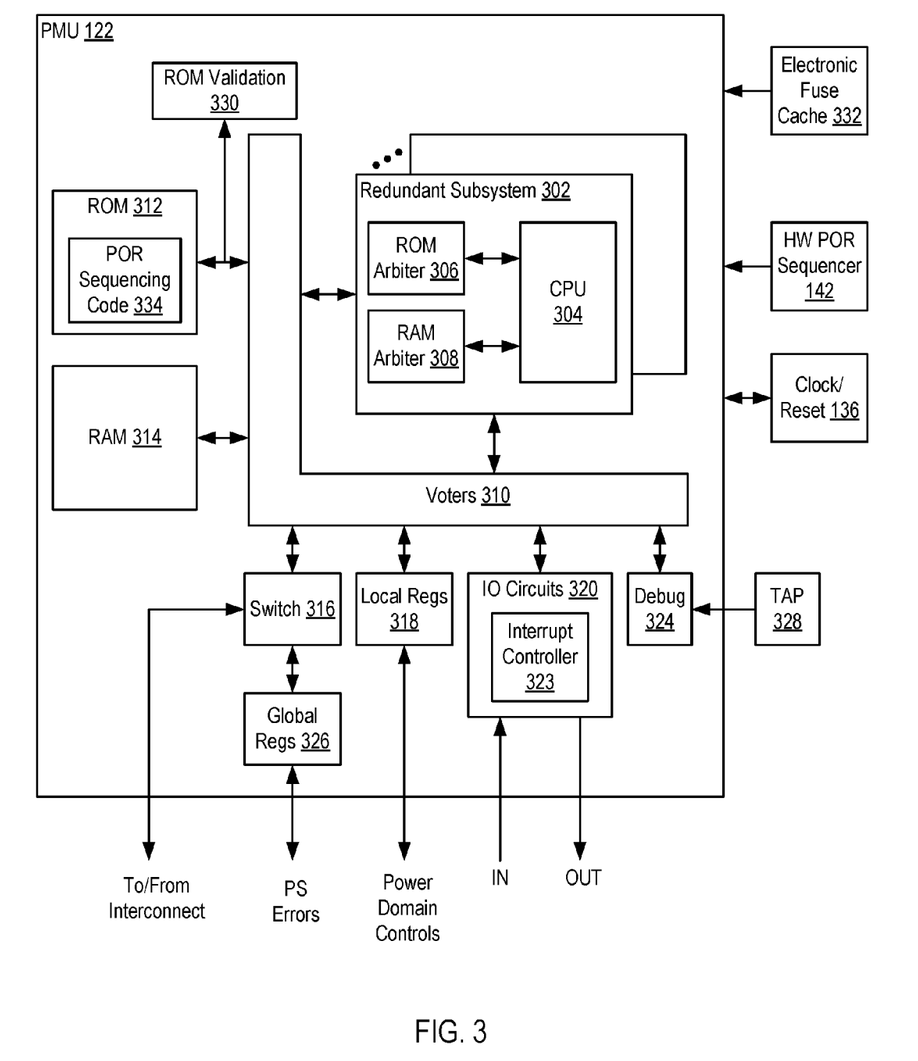
FIG. 3 is a block diagram depicting a platform management unit (PMU) according to an example.

FIG. 3 is a block diagram depicting the PMU 122 according to an example. The PMU 122 includes a plurality of redundant subsystems 302, ROM 312, RAM 314, and other components described below. Each of the redundant subsystems 302 includes a CPU 304, a ROM arbiter 306, and a RAM arbiter 308. The redundant subsystems 302 are coupled to voters 310. The voters 310 are configured to compare the outputs of the redundant subsystems 302 and determine the "correct output". For example, if two redundant subsystems 302 output a first value for a given transaction and one redundant subsystem 302 outputs a second value different than the first value, the voters 310 can select the first value as the output. The ROM 312, the RAM 314, and the other components are coupled to the voters 310 to obtain outputs from and provide inputs to the redundant subsystems 302. The ROM arbiters 306 arbitrate access to the ROM 312 among the instruction and data busses of each CPU 304 in the redundant systems 302. Likewise, the RAM arbiters 308 arbitrate access to the RAM 314 among the instruction and data busses of each CPU 304 in the redundant systems 302. The RAM arbiters 308 can also arbitrate access to RAM 314 for external connections.

The PMU 122 can include other components, such as switch 316, global registers 326, local registers 318, IO circuits 320, debug circuits 324, and ROM validation circuits 330. The switch 316 includes an external interface to the interconnect 124, an interface to the global registers 326, and an interface to the voters 310. The global registers 326 can include an external interface to the PS 104 for accessing values therein (e.g., PS errors). The local registers 318 include an interface to the voters 310 and an external interface to the PS 104 for controlling the power domains. The IO circuits 320 include an interface to the voters 310, and external output interface (OUT), and an external input interface (IN). The debug circuits 324 include an interface to the voters 310 and an external interface coupled to a test access port (TAP) 328 of the test circuits 138. The PMU 122 includes external interfaces to the clock/reset circuits 136, the HW POR sequencer 142, and an electronic fuse cache 322.

The HW POR sequencer 142 controls the reset of the PMU 122. The clock/reset circuits 136 provide a clock for use by the PMU 122. When the HW POR sequencer 142 releases the reset of the PMU 122, the ROM validation logic 330 starts validating the code stored in the ROM 312. After the ROM 312 is validated, the resets to CPUs 304 are released and the CPUs 304 in the redundant subsystems 302 begin executing code stored in the ROM 312. The ROM 312 stores POR sequencing code 334 that specifies a sequence of initialization tasks to complete the power-on initialization process. The CPUs 304 can access registers in the HW POR sequencer 142 to obtain any error information, reset state information (e.g., whether the reset is a POR or a system reset), and the like. The CPUs 304 can further access the electronic fuse cache 332 to obtain various settings and parameters for the PS 104. The HW POR sequencer 142 can read the state of the electronic fuses 144 into the electronic fuse cache 322 in response to a POR. The electronic fuse cache 332 can be stored in the RAM 126 and is used to minimize access to the electronic fuses 144. The POR sequencing code 334 can perform the initialization tasks using the error information reset state information, and settings information as parametric input.

The PMU 122 can use its various output interfaces to control components of the PS 104 to achieve the initialization tasks set forth in the POR sequencing code 334. For example, the redundant subsystems 302 can access components of the PS 104 through the switch 316 and the interconnect 124. The redundant subsystems 302 can set values in the local registers 318 to control power domains and/or islands in the power domains. The redundant subsystems 302 can output information via GPIO through the IO circuits 320 (e.g., error/status information generated during the initialization tasks). Similarly, the redundant subsystems 302 can update information in the global registers 326 (e.g., error/status information generated during the initialization tasks).

After power-on initialization is complete, the PMU 122 can enter a service mode to serve requests from other components in the PS 104. Code for the service mode can be stored in the ROM 312. While in the service mode, the PMU 122 can receive requests through its various input interfaces, and provide output using any of the output interfaces discussed below. For example, the PMU 122 can receive input from other components in the PS 104 through the interconnect 124 and the switch 316. In another example, the IO circuits 320 can include an interrupt controller 323. The PMU 122 can receive input through interrupt requests from other components in the PS 104.

Figure 4:
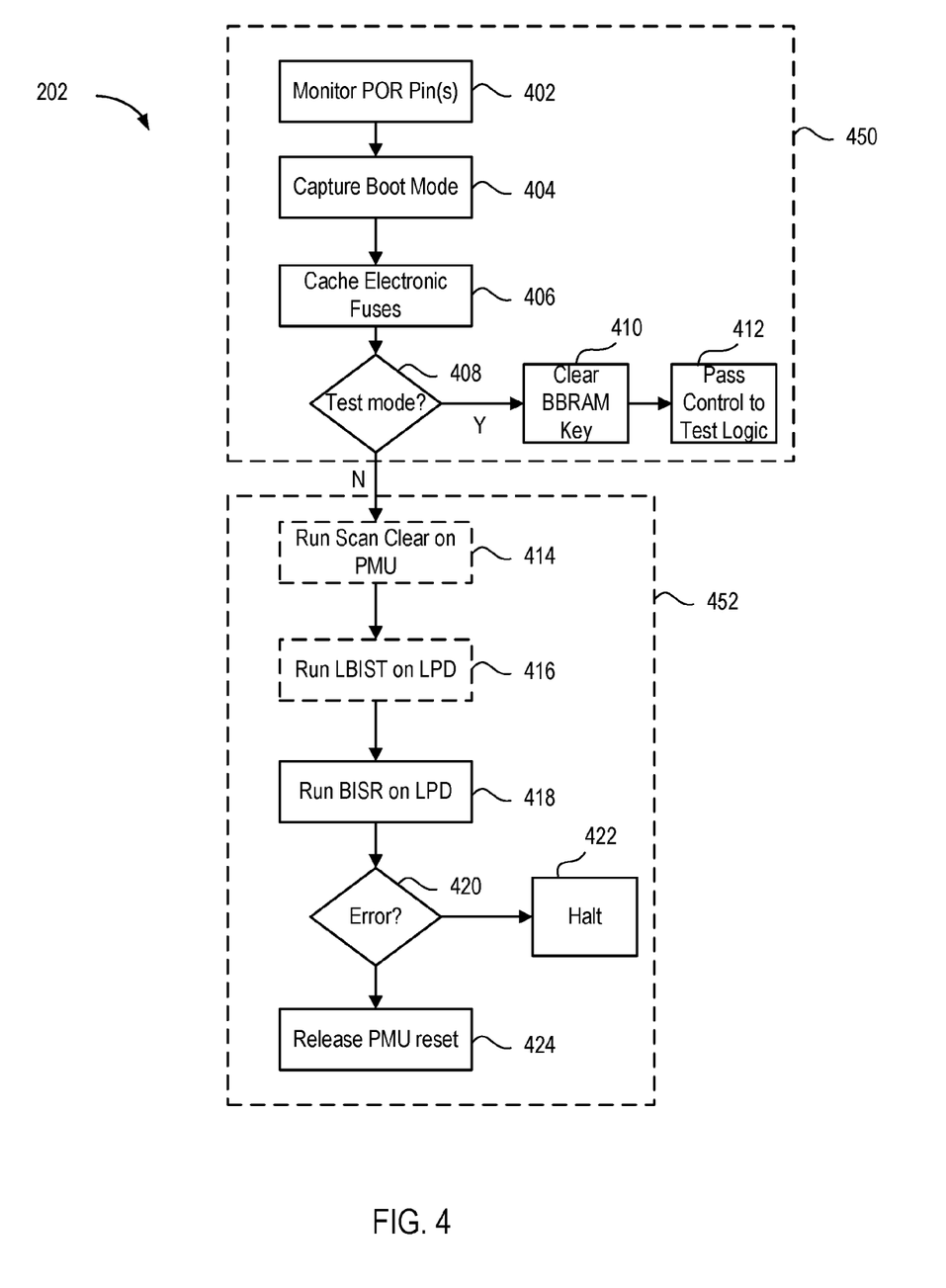
FIG. 4 is a flow diagram depicting a method of pre-PMU initialization performed by a hardware power-on-reset (POR) sequencer according to an example.

FIG. 4 is a flow diagram depicting a method of pre-PMU initialization performed by the HW POR sequencer 142 according to an example. That is, FIG. 4 shows an example of the stage 202 in the method 200 shown in FIG. 2. At step 402, the HW POR sequencer 142 monitors POR pin(s) of the PS pins 135. In response to a POR pin being deasserted, at step 404, the HW POR sequencer 142 captures the boot mode from boot mode pins of the PS pins 135. The programmable SoC 102 can include various boot modes, such as NOR Flash, NAND Flash, SD memory, JTAG, and the like.

At step 406, the HW POR sequencer 142 caches the electronic fuses 144. At step 408, the HW POR sequencer 142 determines whether to enter a test mode. For example, the programmable SoC 102 can include the capability for a special test mode accessible during manufacture (e.g., a manufacturer provided design for test (DFT) mode). If the test mode is invoked, at step 410, the HW POR sequencer 142 can clear any key data in the BBRAM 177 for purposes of security. At step 412, the HW POR sequencer 142 passes control to the test circuits 138. If the test mode is not invoked, the method 400 proceeds to step 414. In an example, the test mode can be disabled through a setting in the electronic fuses 144 (e.g., after being tested during manufacture, the DFT mode can be disabled). The steps 402-412 can be part of a first phase 450 of initialization of the programmable SoC 102.

Step 414 can begin a second phase 452 of initializing the programmable SoC 102 for operation of the PMU 122. At step 414, the HW POR sequencer 142 can run a scan-clear operation on the PMU 122. The scan-clear operation clears the scan-chains in the PMU 122 and reads the data back to confirm the clearing operation. The scan-chains can include a boundary scan chain and/or internal scan chain(s) that are part of the debug circuits 324. At step 416, the HW POR sequencer 142 can run an LBIST operation on the LPD 190. The HW POR sequencer 142 can invoke an LBIST engine in the test circuits 138 to test the logic of the LPD 190. Steps 414 and 416 are shown in dashed-outline and can be optionally performed based on settings stored in the electronic fuses 144.

At step 418, the HW POR sequencer 142 runs BISR on the LPD. The HW POR sequencer 142 can invoke a BISR engine in the test circuits 138 on the LPD. For example, the RAMs in the LPD (part of the RAM 126) can include redundant columns. The electronic fuses 144 can store settings that enable specific redundant RAM columns. A BISR engine in the test circuits 138 can read these settings and enable the appropriate RAM columns. At step 420, the HW POR sequencer 142 determines if there have been any errors in the pre-PMU initialization. If so, the method 400 can proceed to step 422, where the HW POR sequencer 142 halts the power-on/boot process. Otherwise, the method 400 can proceed to step 424, where the HW POR sequencer 142 releases the reset of the PMU 122.

Figure 5A:
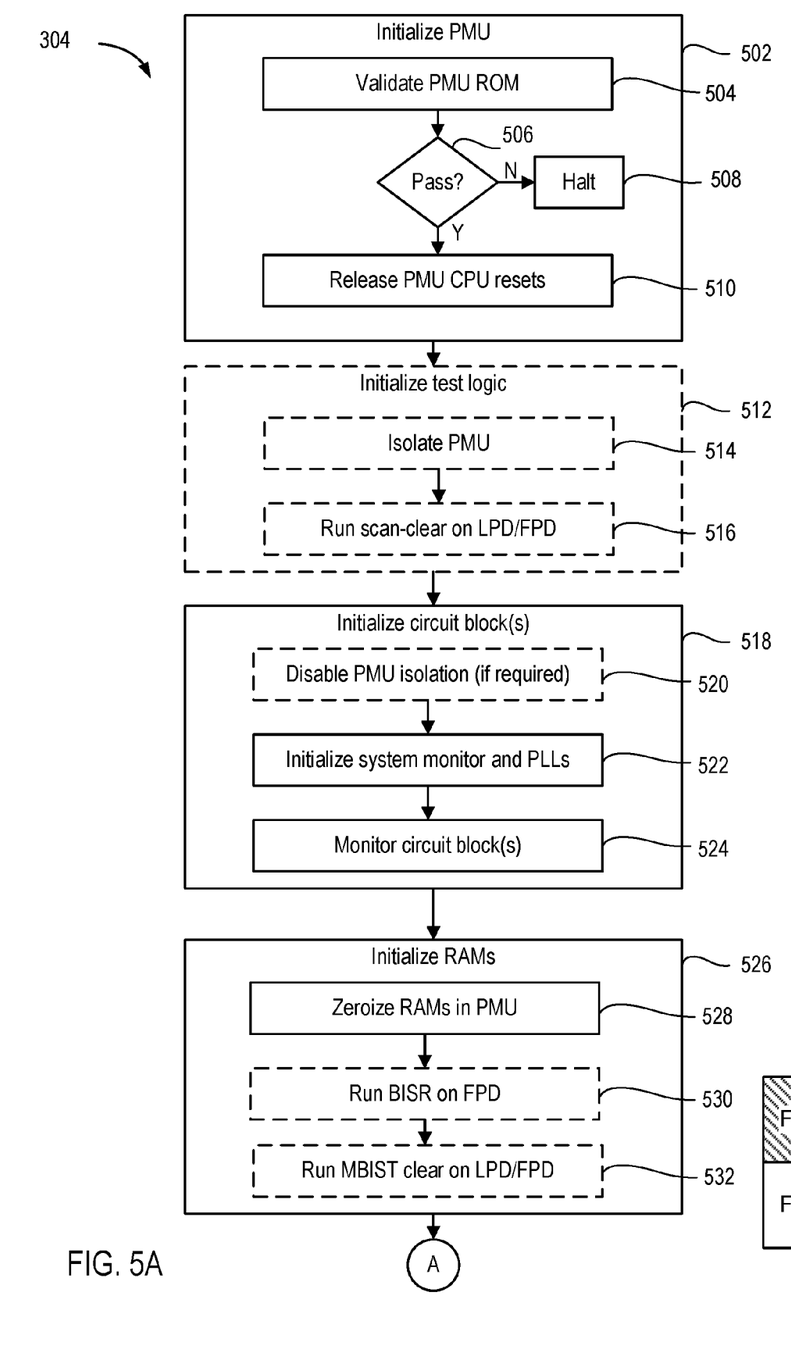
FIGS. 5A and 5B depict a method of pre-boot initialization performed by a PMU according to an example.
Figure 5B:
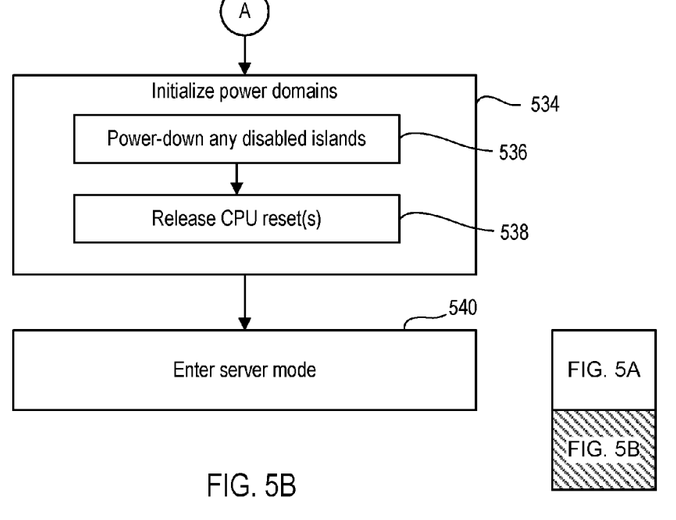

FIGS. 5A and 5B depict a method 500 of pre-boot initialization performed by the PMU 122 according to an example. That is, FIGS. 5A and 5B show an example of the stage 204 of the method 200 shown in FIG. 2. The method of FIG. 5 can be performed by the PMU 122 through execution of the POR sequencing code 334 in the ROM 312.

At step 502, the PMU 122 performs an initialization. Step 502 can include steps 504-510. At step 504, the PMU 122 triggers validation of the ROM 212. The PMU 122 can invoke the ROM validation circuit 230 to authenticate the code stored in the ROM 212. At step 506, the PMU 122 determines if the validation was successful. If not, the method 508 proceeds to step 508, where the PMU 122 halts the power-on/boot process. Otherwise, the method 500 proceeds to step 510, where the PMU 122 releases the resets on the CPUs 304.

At step 512, the PMU 122 optionally initializes test logic in the programmable SoC 102. For example, at step 514, the PMU 122 can isolate itself from the other components of the PS 104. At step 516, the PMU 122 can run a scan-clear operation on the LPD, the FPD, or both. Steps 514 and 516 can be conditionally performed depending on settings in the electronic fuses 144 and on the type of reset being performed. For example, the scan-clear operation can be performed if enabled in the electronic fuses 144 and if the type of reset is a POR. If disabled in the electronic fuses 144 or if the type of reset is a system reset (warm reset), then the PMU 122 can skip steps 514 and 516.

At step 518, the PMU 122 initializes one or more circuit blocks in the PS 104. For example, at step 520, the PMU 122 can disable its isolation if invoked at step 514. Otherwise, the PMU 122 can skip step 520. At step 522, the PMU 122 can initialize the system monitor 168 and the PLLs 137. Circuits such as the PLLs 137 and the system monitor 168 may take some period of time to reach steady state and be fully initialized. After initializing the circuit block(s), the PMU 122 can monitor the circuit block(s) at step 524 to determine when the initialization is complete.

At step 526, the PMU 122 initializes RAMs in the PS 104. For example, at step 528, the PMU 122 can load zeros into one or more RAM modules of the RAM 126, such as the RAM 314 in the PMU 122. At step 530, the PMU 122 optionally runs a BISR operation on the FPD. The PMU 122 can invoke a BISR engine in the test circuits 138 to perform the BISR operation on the components in the FPD. At step 532, the PMU 122 can optionally run an MBIST clear operation on the LPD, the FPD, or both. The PMU 122 can invoke the MBIST engine in the test circuits 138 to perform the MBIST clear operation on one or more RAMs of the RAM 126. The steps 530 and 532 can be conditional based on the type of reset (e.g., performing such steps in case of POR and skipping such steps in case of system reset).

At step 534, the PMU 122 initializes the power domains. For example, at step 536, the PMU 122 can power-down any disabled islands. In some cases, one or more islands in the programmable SoC 102 can be intentionally disabled using settings in the electronic fuses 144. These disabled islands can be initially powered in order to simplify testing of the device, but are then powered down per the settings in the electronic fuses 144. At step 538, the PMU 122 can release one or more CPU resets. For example, the PMU 122 can release the reset of the CSU 120 in order to start execution of the BootROM. At step 540, the PMU 122 enters a server mode. In the server mode, the PMU 122 can service requests from other components in the PS 104, as discussed below.

Figure 6:
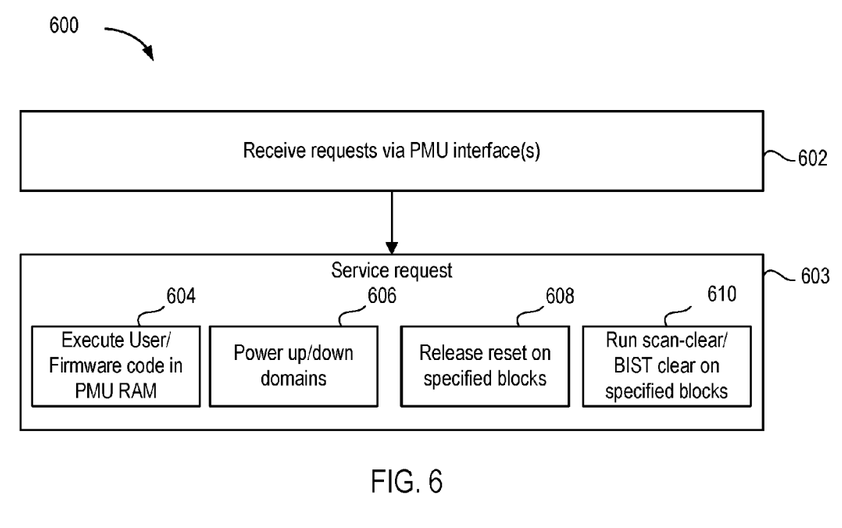
FIG. 6 is a flow diagram depicting an example method of servicing requests at a PMU while in a server mode.

FIG. 6 is a flow diagram depicting an example method 600 of servicing requests at the PMU 122 while in the server mode. At step 602, the PMU 122 receives one or more requests via one or more PMU interfaces. For example, the PMU 122 can receive a request through an interrupt, through a general purpose input (GPI), through a write to the global registers 226, or through the interconnect 124. At step 603, the PMU 122 services the request. For example, at step 604, the PMU 122 can execute user/firmware code stored in the RAM 314. As discussed below, execution of the FSBL 180 by the CSU 120 can result in loading user/firmware code to the RAM 314. The CSU 120 can request that the PMU 122 execute the user/firmware code in the RAM 314 using an inter-processor interrupt (IPI). At step 606, the PMU 122 can power-up or power-down one or more domains or islands. At step 608, the PMU 122 can release a reset on one or more specified blocks. At step 610, the PMU 122 can invoke a scan-clear or BIST operation on one or more specified blocks.

Figure 7:
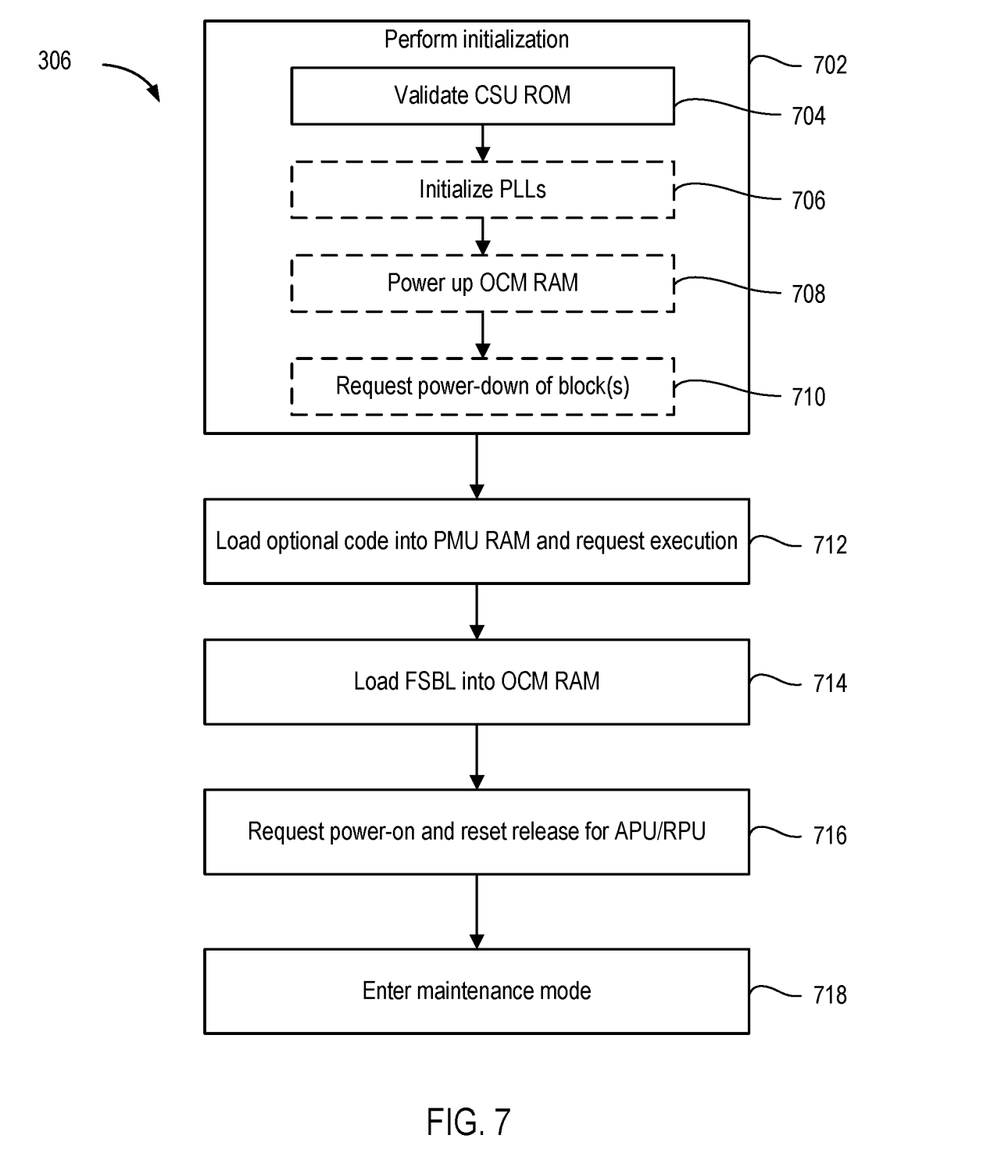
FIG. 7 is a flow diagram depicting a method of initiating a boot process according to an example.

FIG. 7 is a flow diagram depicting a method of initiating the boot process according to an example. That is, FIG. 7 shows an example of the stage 206 of the method 200 shown in FIG. 2. The method of FIG. 7 can be performed by the CSU 120 while executing the BootROM. At step 702, the CSU 120 performs initialization. For example, at step 704, the CSU 120 can validate its ROM. At step 706, the CSU 120 can optionally initialize the PLLs 137 (if not already initialized by the PMU 122). At step 708, the CSU 120 can optionally power-up the OCM in the RAM 126 (if not already powered up by the PMU 122). At step 710, the CSU 120 can optionally request power-down of one or more blocks.

At step 712, the CSU 120 can load optional code in the RAM 314 of the PMU 122 and request the PMU 122 to execute of such optional code. At step 714, the CSU 120 can load the FSBL 180 into the OCM of the RAM 126. At step 716, the CSU 120 can request the PMU 122 to power-on and reset release for the APU 116 and/or the RPU 118. At step 718, the CSU 120 can enter a maintenance mode. The CSU 120 can service requests from other components in the PS 104 while in the maintenance mode. The process shown in FIG. 7 is merely one example of the types of operations that can be performed through execution of the BootROM.

Figure 8:
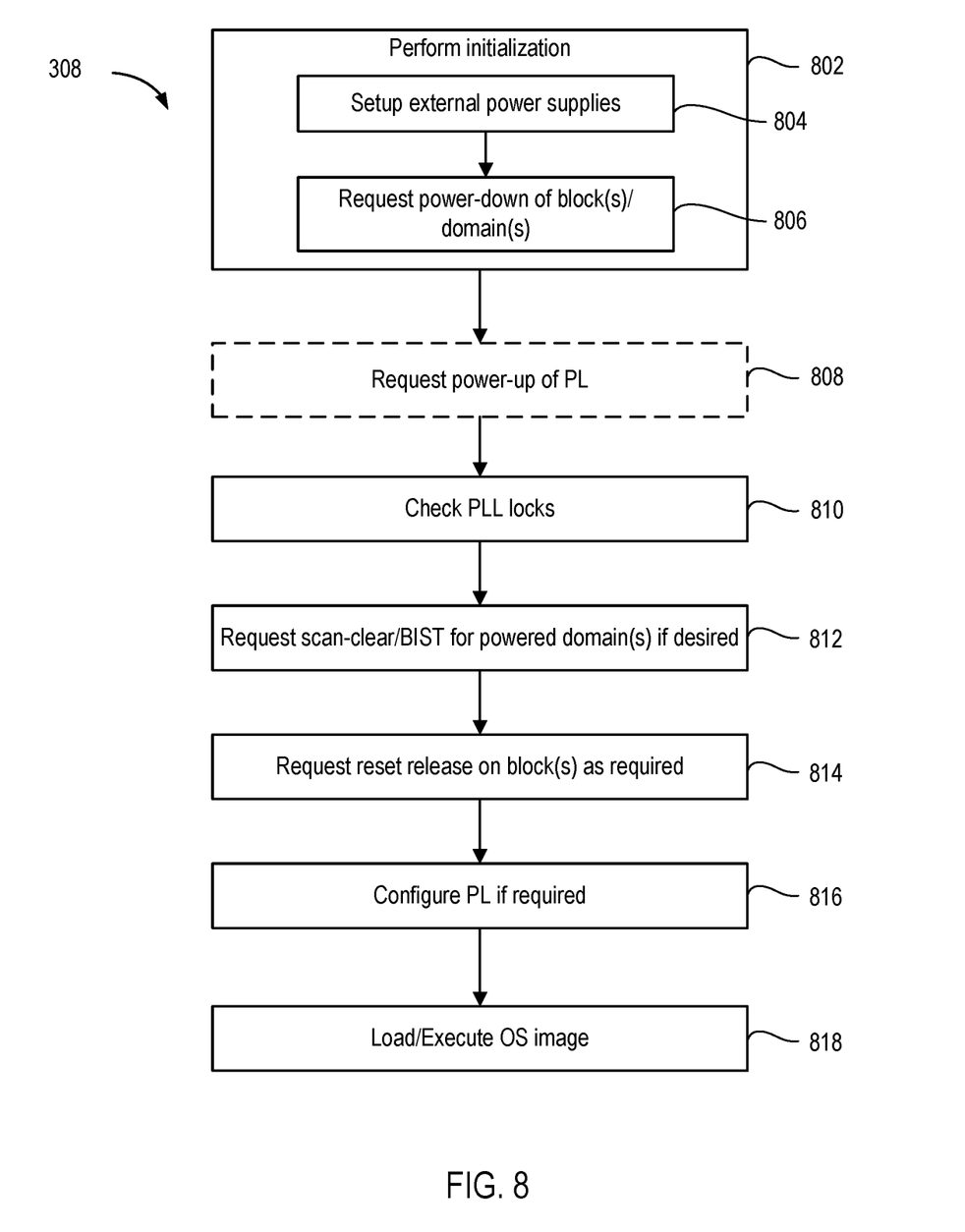
FIG. 8 is a flow diagram depicting a method of booting according to an example.

FIG. 8 is a flow diagram depicting a method of booting according to an example. That is, FIG. 8 shows an example of the stage 208 of the method 200 shown in FIG. 2. The method of FIG. 8 can be performed by the APU 116 or the RPU 118 while executing the FSBL 180. At step 802, the APU 116/RPU 118 performs initialization. For example, at step 804, the APU 116/RPU 118 sets up external power supplies. At step 806, the APU 116/RPU 118 requests power-down of block(s)/domain(s).

At step 808, the APU 116/RPU 118 can optionally request power-up of the PL 106. At step 810, the APU 116/RPU 118 checks the lock state of the PLLs 137. At step 812, the APU 116/RPU 118 requests the PMU 122 to perform scan-clear/BIST for powered domains if desired. At step 814, the APU 116/RPU 118 requests the PMU 122 to release reset on block(s) as required. At step 816, the APU 116/RPU 118 configures the PL 106 if required. At step 818, the APU 116/RPU 118 loads/executes the OS/SW 184 in the system image 178. The process shown in FIG. 8 is merely one example of the types of operations that can be performed through execution of a FSBL.

While the foregoing is directed to specific examples, other and further examples may be devised without departing from the basic scope thereof, and the scope thereof is determined by the claims that follow.

What is claimed is:

1. A system-on-chip (SoC), comprising:
 a hardware power-on-reset (POR) sequencer circuit coupled to a POR pin;
 a platform management unit (PMU) circuit, coupled to the hardware POR sequencer circuit, the PMU including one or more central processing units (CPUs) and a read only memory (ROM);
 random access memory (RAM);
 one or more circuit blocks;
 a first processing unit having a ROM that stores BootROM code executable by the first processing unit to store a boot loader in the RAM; and
 a second processing unit configured to execute the boot loader stored in the RAM;
 wherein the hardware POR sequencer circuit is configured to initialize the PMU; and
 wherein the one or more CPUs of the PMU are configured to execute code stored in the ROM to perform a pre-boot initialization of the one or more circuit blocks prior to initialization of the first processing unit, the second processing unit, and execution of the BootROM code by the first processing unit.

2. The SoC of claim 1, further comprising:
 test circuits;
 wherein the pre-boot initialization includes initializing the test circuits.

3. The SoC of claim 1, wherein the one or more circuit blocks include at least one of a phase locked loop (PLL) or a system monitor.

4. The SoC of claim 1,
 wherein the pre-boot initialization includes initializing the RAM.

5. The SoC of claim 4, wherein initializing the RAM includes at least one of loading zeros into the RAM, performing a memory built-in-self-test (MBIST) on the RAM, or performing a built-in-self-repair (BISR) on the RAM.

6. The SoC of claim 1, further comprising:
 a plurality of power domains;
 wherein the pre-boot initialization includes initializing the power domains.

7. The SoC of claim 1,
 wherein the boot process includes loading a boot loader into the RAM.

8. The SoC of claim 1, wherein the pre-boot initialization includes releasing a reset of the first processing unit.

9. A method of booting a system-on-chip (SoC), comprising:
 performing one or more first initialization tasks using a hardware power-on-reset (POR) sequencer circuit;
 performing one or more second initialization tasks to initialize one or more circuit blocks, prior to initialization of a first processing unit, a second processing unit, and execution of code in a boot read-only memory (ROM) by the first processing unit, by executing code stored in a using a platform management unit (PMU);
 executing the code in the boot ROM using the first processing unit to store a boot loader in a random access memory (RAM); and
 executing the boot loader stored in the RAM using the second processing unit.

10. The method of claim 9, wherein the first initialization tasks include initialization of the PMU.

11. The method of claim 9, wherein the second initialization tasks include initializing test circuits.

12. The method of claim 9, wherein the second initialization tasks include initialization random access memory (RAM).

13. The method of claim 9, wherein the second initialization tasks include initializing power domains.

14. The method of claim 9, further comprising:
 servicing one or more requests from at least one of the first processing unit or the second processing unit at the PMU.

15. A non-transitory computer readable medium having instructions stored thereon that when executed in a system-on-chip (SoC) cause a platform management unit (PMU) to perform a method of:
 one or more first initialization tasks using a hardware power-on-reset (POR) sequencer circuit;
 one or more second initialization tasks to initialize one or more circuit blocks, prior to initialization of a first processing unit, a second processing unit, and execution of code in a boot read-only memory (ROM) by the first processing unit, by executing code stored in a ROM using a platform management unit (PMU);
 executing the code in the boot ROM using the first processing unit to store a boot loader in a random access memory (RAM); and
 executing the boot loader stored in the RAM using the second processing unit.

16. The non-transitory computer readable medium of claim 15, further comprising: servicing one or more requests from at least one processing unit of the SoC.

17. The non-transitory computer readable medium of claim 15, wherein the first initialization tasks include initialization of the PMU.

18. The non-transitory computer readable medium of claim 15, wherein the second initialization tasks include initializing test circuits.

19. The non-transitory computer readable medium of claim 15, wherein the second initialization tasks include initialization random access memory (RAM).

20. The non-transitory computer readable medium of claim 15, wherein the second initialization tasks include initializing power domains.

* * * * *